United States Patent [19]

Armstrong

[11] Patent Number: 4,505,409
[45] Date of Patent: Mar. 19, 1985

[54] BEVERAGE-DISPENSER VALVE ARRANGEMENTS

[75] Inventor: Alfred Armstrong, Norwood, Mass.
[73] Assignee: Crathco, Inc., Canton, Mass.
[21] Appl. No.: 496,409
[22] Filed: May 20, 1983
[51] Int. Cl.$^3$ .............................................. B67D 3/02
[52] U.S. Cl. ................................... 222/509; 222/514; 137/315; 251/245; 403/252
[58] Field of Search ........................ 137/315; 251/245; 403/252, 349; 222/509, 514, 525, 513

[56] References Cited

U.S. PATENT DOCUMENTS

| | | | |
|---|---|---|---|
| 2,120,623 | 6/1938 | Oxford et al. | 403/349 |
| 2,658,648 | 11/1953 | Tribbitt | 222/509 |
| 2,719,750 | 10/1955 | Orr | 403/252 |
| 3,269,606 | 8/1966 | Armstrong | 222/509 |
| 4,161,971 | 7/1979 | Arzberger et al. | 222/509 |

Primary Examiner—H. Grant Skaggs
Attorney, Agent, or Firm—James E. Mrose

[57] ABSTRACT

In a beverage dispenser of the type in which conditioned liquid is to be tapped through a bottom opening of a bowl normally closed from within by a valve member, unseating of the valve member and attendant gravitational release of liquid are conveniently brought about by tilting a wider Z-shaped sheet-metal handle which is keyed with the valve member to form an interlocked valving assembly further including only a spring and a suspension provided by external bowl flanges. The valve member, which has a flattened end projecting through the bowl to key itself locked within an opening of cooperating shape in the center portion of the handle, is biased closed by the surrounding spring trapped in a compressed condition between the handle and the underside of the bowl, and the keyed interlocking with the end of the valve member holds the handle in a desired lateral fit within frontal notches of the flanges for pivotal movements allowing it to raise the valve member in its sleeving for release of beverage through a lower center opening fed by upper lateral openings. Once it is angularly keyed into place, the valve member cannot be accidentally dislodged, because small tabs struck integrally from the handle are disposed to engage and align its flattened end each time the handle is tilted either by pulling an upstanding end or pushing its other depending end. Advantageously, sealing of the valve may be tightened, against constrictions offered by solids from the liquid, for example, by forcing the handle ends in directions opposite to those which cause liquid to be dispensed.

10 Claims, 9 Drawing Figures

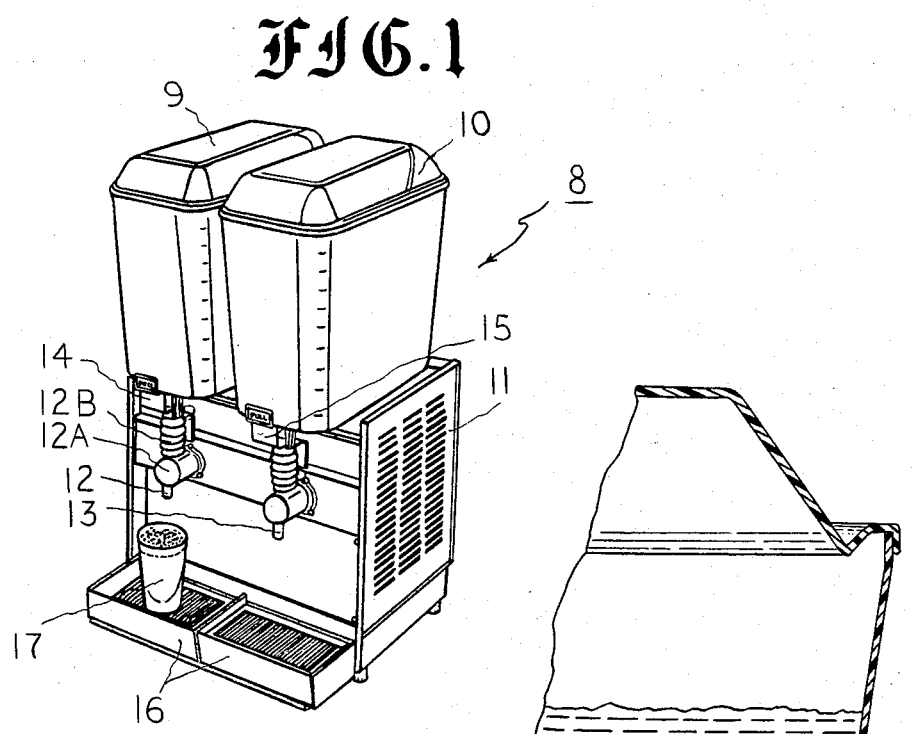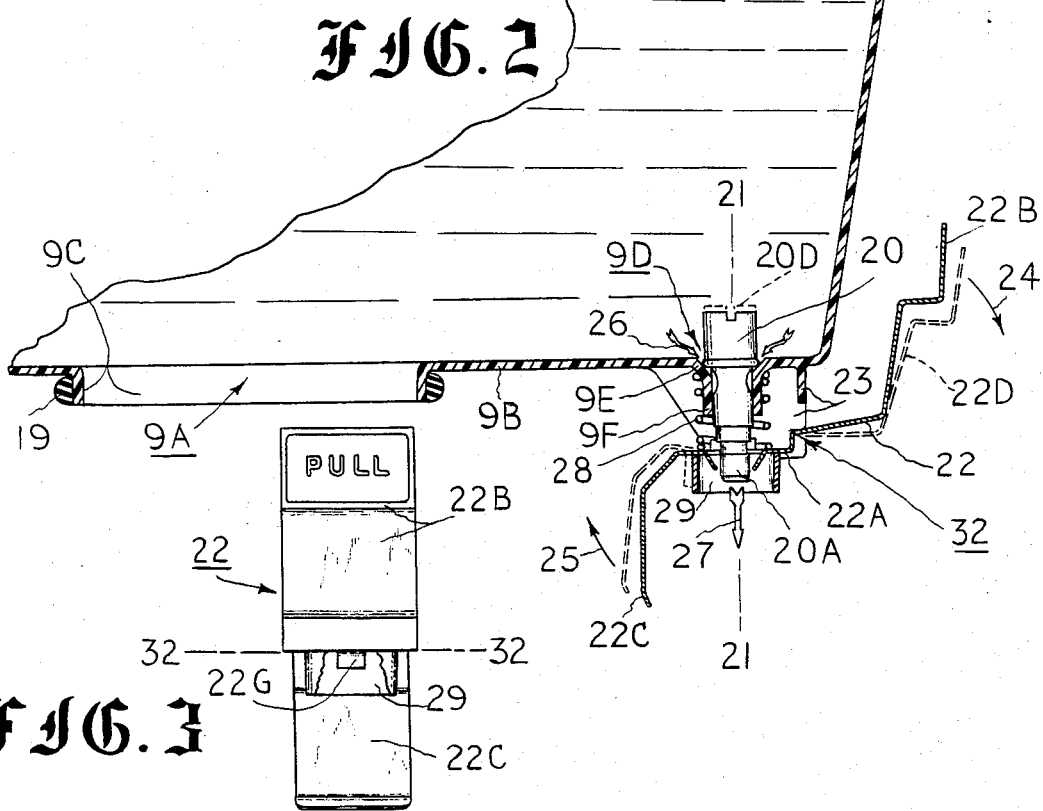

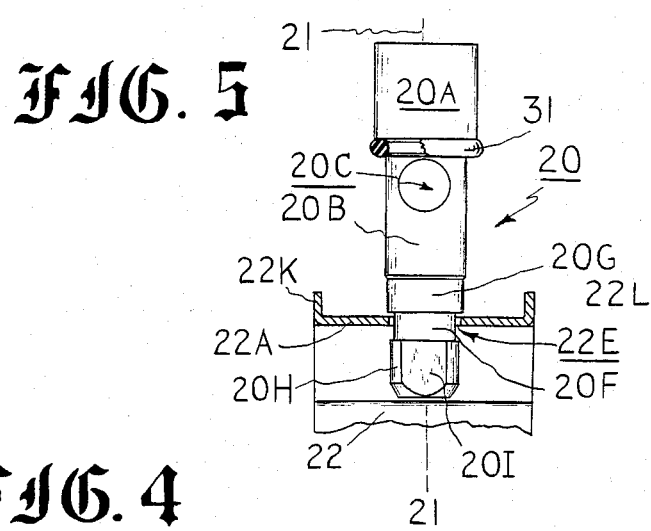
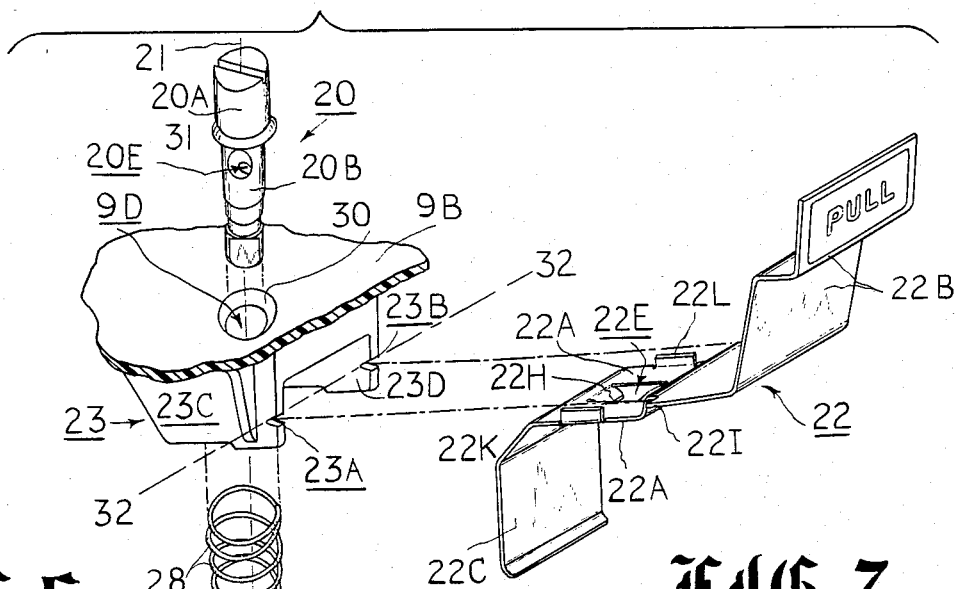
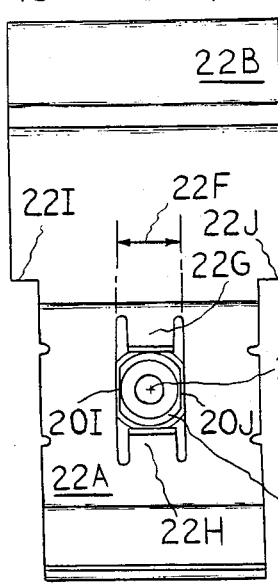
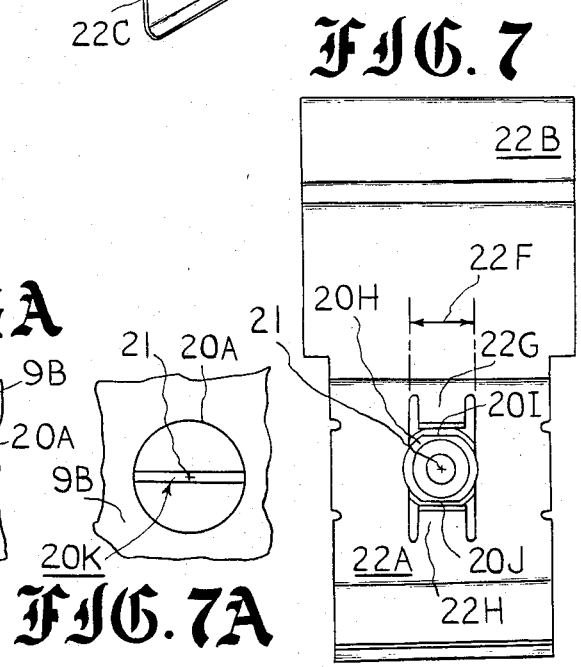
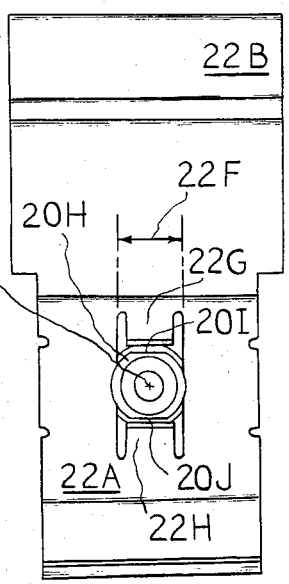

BEVERAGE-DISPENSER VALVE ARRANGEMENTS

BACKGROUND OF THE INVENTION

The present invention relates to improvements in valves for beverage dispensers, and, in one particular aspect, to novel and improved valving arrangements of uncomplicated low-cost construction which are easily actuated and are of special advantage in commercial beverage-dispenser and like applications where no uncommon skill is required to take them apart and re-assemble them routinely into tight-sealing operative condition.

Beverage dispensers are known in a variety of self-contained forms wherein they chill, heat, aerate, whip or otherwise condition liquids, and from which the contents may be withdrawn in needed amounts upon operation of a manually-actuated valve. One such dispenser, including a gravity-seated valve member with broad-area exposure to the conditioned liquid within which it is immersed, is described in my U.S. Pat. No. 3,269,606; there, a lever arm hung rearwardly of a cup-filling position may be pressed back to tilt and lift the valve member from its seat for release of liquid from a bowl. In another lifting arrangement for a dispenser valve, as shown in U.S. Pat. No. 3,060,702, a cup receives beverage when forced upwardly against a radially-spoked lifter. Lever-type valve lifting in such devices was an expedient well known long ago (U.S. Pat. No. 545,284), and, of course, the use of conventional spigots has also been described (U.S. Pat. No. 2,087,465). Pull-type levers (U.S. Pat. No. 3,108,718) and separately-manipulated handles (U.S. Pat. No. 2,734,357) have likewise been proposed for actuations of dispenser valves.

Maintenance procedures for such equipment call for the liquid-contacting parts to be kept scrupulously clean; and that may entail periodic dismantling and re-assembly by personnel who may have had no unusual technical training. Accordingly, the valving arrangements involved should be uncomplicated and consist of but few readily-handled components which may easily be taken apart, cleansed, and put together in good working order. Particularly when the conditioned beverages contain solid particles which may interfere with full seating and sealing of the dispenser valve, it can be important to have some means of tightening the sealing during normal use. In addition, it can be advantageous to allow either pull or press type actuations of such valves by the operator. The present invention resolves such maintenance, sealing and actuation problems in a highly satisfactory manner.

SUMMARY

By way of a summary account of practice of this invention in one of its aspects, the bowl of a beverage conditioner and dispenser has a special form of vertically-slidable valve member disposed to mate with an annular valve seat surrounding a bottom opening through a forward portion of the bowl which overhangs an overflow tray. When rested at its lowermost position, the spindle-shaped valve member closes the seat by forming essentially a "line" contact between a surrounding O-ring seal and a downwardly-tapering annular surface which forms the valve seat at the bottom of the bowl. Below that seal, the valve member exhibits an elongated uniform-diameter stem which is mated closely within a short hollow cylindrical sleeve projecting below the valve seat and defining the bottom opening of the bowl Fit between the stem and sleeve is tight enough to establish capillary-type liquid sealing which avoids significant dripping when the valve member is raised and liquid gravitates to below the O-ring and thence through lateral openings in the stem and downwardly centrally through the hollow lower end of the valve member. A short distance above that lower end, and spindle-like valve member is necked down to a reduced diameter, and, below that, near the very end, two diametrically-opposite parallel flat external surfaces are formed, spacing between those surfaces being about the same as the necked-down diameter. The reduced-diameter and flattened portions near the lower end of the valve member are elements of a keying feature by which that end may be angularly aligned to fit through a narrow slot in the horizontal mid-section of a Z-shaped sheet-metal handle, and, once there, to be locked or trapped in place upon being turned somewhat. The slotted handle has shoulders by which it may be hung for pivotal movements in cooperating notches of depending bowl flanges, and the handle will not become dislodged accidentally so long as locking with the valve member is maintained. A spring surrounding the lower end of the valve member, above the handle, tends to force the handle downwardly and to maintain the valve normally closed unless it is intentionally lifted by either manually pulling an upper end of the handle or pushing its lower end. Tightening of the sealing, so as to overcome leakage problems caused by pulp or like matter, may be accomplished merely by reversing those manual actuations. Unintended separation of the locked-together handle and valve member is avoided by regularly-occurring corrective action of small tabs struck from the slot and disposed to engage and angularly orient the flat surfaces each time the valve handle is actuated.

Accordingly, it is one of the objects of the present invention to provide novel and improved beverage-dispenser valving in which simple readily-serviced components may be keyed into and maintained in a self-locking relationship.

A further object is to provide a unique and advantageous lift-type valve, for beverage dispensers or the like, in which either pull or push operations of a valve handle may control release of the beverage and may also aid in tightening the sealing on occasion, and in which the valve, handle and mounting components are keyed into and maintained in self-locked assembly.

BRIEF DESCRIPTION OF THE DRAWINGS

Although the aspects of this invention which are considered to be novel are expressed in the appended claims, additional details as to preferred practices of the invention and as to further objects, advantages and features thereof may perhaps be most readily comprehended through reference to the following description taken in connection with the accompanying drawings, wherein:

FIG. 1 is a pictorial representation of a beverage conditioner and dispenser of the type in which the present teachings may be exploited to distinct advantage;

FIG. 2 provides a cross-sectional side view of the forward portion of a beverage bowl provided with a valve arrangement in accordance with a preferred practice of the invention;

FIG. 3 portrays the handle of the FIG. 2 valve arrangement, from the front, with a ring sleeve partly broken way to expose certain tabbing;

FIG. 4 is an exploded view of elements of a valve arrangement essentially like that appearing in FIG. 2;

FIG. 5 represents the keyed valve member and a portion of the interlocked handle, of the valve arrangement of FIG. 4, on a somewhat enlarged scale;

FIG. 6 illustrates, from below, the keyed fitting of the valve member and its handle;

FIG. 6A represents the observable angular orientation of the valve member, from above, when it is being fitted with its handle as shown in FIG. 6;

FIG. 7 illustrates, from below, the locking achieved between the valve member and its handle when they are angularly positioned in readiness for use; and FIG. 7A represents the observable angular orientation of the valve member, from above, when it is properly locked with its handle as shown in FIG. 7.

DESCRIPTION OF THE PREFERRED EMBODIMENTS

The liquid conditioner and dispenser unit 8 illustrated in FIG. 1 includes a generally-conventional array of transparent beverage bowls 9 and 10 atop a stand 11 which accomodates the usual heating, cooling, circulating, control and other equipment appropriate to the intended use of the unit. Dispensing of beverage occurs from spouts 12 and 13 which, in the particular unit shown, depend from whipper housings such as 12A fed from above through bellows-type adapters such as 12B disposed to receive the discharge from valve arrangements actuated by the handles 14 and 15, respectively. Front trays 16 conveniently collect any overflow or after-drip when a beverage container 17 has been filled at that site. Handles 14 and 15 project forwardly and upwardly, where their free ends there may be pulled to cause discharge of beverage. As appears more fully hereinafter, the handles may also be pressed rearwardly, to tighten sealing of suspended solids or the like tend to prevent the valve from closing completely.

Having reference to the cross-sectioned representation of part of a bowl 9 in FIG. 2, having a beverage content 18, it will be noted that the base surface 9B is substantially flat, interrupted by a large circular opening 9A surrounded by a short downwardly-extending rim 9C which is intended to be mated within an upper recess of the stand 11 and there exposed to a cooling plate and pumping assembly. A deformable gasket or sealing ring 19 is fitted about rim 9C to seal the bowl in its mating with the stand. Forwardly of this, a second and smaller base opening 9D, for valving, is occupied by an elongated valving member 20, and is defined by an upper truncated conical portion 9E merging with a narrower downwardly-extending rim 9F which is of uniform-diameter right-cylindrical configuration and serves as a sleeve or bushing for vertical seating and unseating movements of valving member 20 along a vertical axis 21—21. The valve opening, bushing and valving member are all accommodated at a front portion of the bowl which freely overhangs the front of the stand when the bowl and stand are properly fitted together; this overhang also allows space below for a sheet-metal Z-shaped handle 22 and the flange unit 23 on which the handle rests and pivots for the tilting actions by which it may actuate the valve member. In the latter connection, the handle 22 has a horizontal mid-section 22A having a separable keyed and trapped relationship with the lower end 20A of the valve member 20, and its forward upstanding end section 22B may be pulled in direction of arrow 24, or its rear depending end section 22C may be pressed in the direction of arrow 25, to cause the valve to be lifted for a dispensing of beverage. As also appears more fully hereinafter, the trapped relationship is bi-directional and the handle is not otherwise blocked from movement, thus allowing the handle to be pushed or pulled in directions opposite to those already referred to, for purposes of pulling the valve member down and tightening its seating in the truncated conical portion 9E of the base. Dashed linework 22D characterizes deflection of the handle when valve lifting, and liquid dispensing, are to occur, and dashed linework 20D characterizes a lifted and dispensing position for the valve member 20. Arrows 26 and 27 characterize the gravitational flow of liquid 18 first past the valve seat and then downwardly out of a center opening through the hollow lower portion of valve member 20. A helical spring 28 is interposed and compressed between the handle section 22A and the bottom of the bowl, to urge the valve member toward a seated and closed condition when it is not being intentionally lifted. In the illustrated embdiment wherein whipping is provided by the dispenser assembly, discharge of liquid from the valve member 20 is guided into the whipper unit 12A (FIG. 1) by an adapter 12B, and the latter is fitted about a ring sleeve 29 tack-welded to the bottom of handle section 2A; however, such a sleeve is not needed in other dispenser assemblies, and it is therefore not illustrated in all of the other drawings.

The more detailed and exposed representations in FIGS. 4 and 5 aid in understanding certain of the relationships already discussed. Bowl opening 9D presents an annular seating surface 30 to valve member, and that conical seating surface is preferably of appropriate finish to effect good sealing when engaged in substantially line-contact relationship by a deformable O-ring 31 fixed to the valve member near its enlarged upper closed end 20A. Immediately below that O-ring, the valve member presents a relatively long uniform-diameter shoulder 20B of somewhat smaller diameter, complementing and making a relatively close fit with the inner diameter of the bowl brushing 9F. Liquid which is released when ring 31 is lifted from seat 30 tends not to flow between shoulder 20B and its surrounding bushing 9F, because of capillary-type restraints developed by the close spacing between them, and, instead, is delivered through one or more lateral openings, such as 20C, which merge with a longitudinal opening 20E running downwardly through the hollow lower portions of the valve member. Importantly, those lower portions of the valve member are specially shaped to allow for separable keying and trapping of that member with the mid-section of the valve handle 22. In particular, the valve member is necked down to a relatively small diameter along a section 20F, just below a larger-diameter section 20G and above another larger-diameter lower end section 20H. The length of section 20F is generously in excess of the thickness of material of the sheet-metal handle mid-section 22A, so that some "play" is afforded when the two are trapped together, as shown in FIG. 5. An elongated slot, 22E, in mid-section 22A of the handle, is of width narrower than the diameters of both sections 20G and 20H of the valve member, such that, once it is engaged about the smaller-diameter section 20F, it tends to remain loosily locked or trapped with it. Assembly of the two parts into that interlocked relation is possible only because the larger-diameter lower end section is provided with diametrically-opposite "flats", such as 20I and 20J (FIG. 6), whose spacing is just less than the width 22F of the slot, thereby allowing insertion of the end 20H freely through the slot when it is angularly oriented as shown in FIGS. 6 and 6A. In FIG. 6A, which views the top of the valve member from above, looking downwardly into the bowl 9, the valve member is seen to be slotted at 20K, to provide a visual aid to manual alignment of the valve member into its fit within the handle slot. Once in that fitted relation, however, the upper end 20A of the valve member is turned about 90° (FIGS. 7 and 7A), causing the "flats" to lie transversely to the narrow elongated slot and disposing the wide-diameter portions of end section 20H so that they necessarily catch or interfere with the underside of handle section 22A (FIG. 7) and prevent the handle from becoming unintentionally separated from the valve member. Unlocking is of course accomplished merely by returning the valve member angularly to about the original angular position (FIGS. 6 and 6A).

Although the valve member may be intentionally unkeyed or turned 90° so as to release the handle from its lower end, such an occurrence is rendered virtually impossible as an accidental matter because of self-aligning actions of small tabs 22G and 22H struck downwardly from the mid-section of the handle. Those tabs are disposed at the two narrower ends of the slot 22E, and their parallel ends extend transversely of the slot and confront one another across the slot with a spacing just slightly in excess of the diameter of the lower end 20H of the valve member, so that the latter may be turned into locking position. However, once the locking orientation has been set, the ends of the two tabs 22G and 22H are disposed to engage and angularly re-align the "flats" 20I and 20J each time the handle is tilted, if they should tend to wander out of the set position. The tabs extend enough downwardly from the bottom of the handle mid-section (FIG. 3) so that they can engage the "flats" below that level, and sufficient material for that purpose is available when the slot 22E is being stamped out.

Handle or lever 22 achieves the valve lifting, and seal tightening, by pivoting about a horizontal axis 32—32 at the front of the assembly. Suspension for that pivoting is afforded by the flange unit 23, which may be conveniently molded as part of the plastic bowl structure and has a pair of aligned notches 23A and 23B, in its two spaced flange legs 23C and 23D, respectively. Handle 22 has cooperating laterally-extending shoulders, such as 22I and 22J (FIGS. 3 and 4), upon which the handle may be hung in the two notches, with the mid-section of the handle disposed essentially horizontally between the flange legs 23C and 23D. Alignment of the handle within the flange unit may be augmented by providing upstanding edge lugs 22K and 22L on its mid-section 22A.

In other arrangements, the valve seat and bushing elements, and the handle-suspending flange unit, may be fabricated and attached separately, rather than being integral with material of the bowl. The valve member may be provided with enough mass at its upper end to force it gravitationally to a satisfactory normal seating, and the spring 28 may in such instances be omitted. Alternatively, the spring action may be developed in other ways and with different forms and locations of springs. The lower end of the handle may serve to engage and actuate a switch, such as one which excites a whipper unit, when the handle is tilted for dispensing purposes, and, depending upon the needs of the application, the handle may have only one rather than both of the upstanding "pull" and depending "press" ends 22B and 22C. Although the two illustrated "flats" 20I and 20J are preferred for the dovetailing-type keying and locking, only one such flat may be used, and only one of the cooperating alignment tabs 22G and 22H may be employed. Other releasable dovetailing geometries, rather than the illustrated parallel flats, may also be used when they will serve like purposes. Accordingly, it should be understood that the specific embodiments and preferred practices shown and described herein have been presented by way of disclosure rather than limitation, and that certain departures may be accommodated within the spirit and scope of this invention in its broader aspects and as set forth in the accompanying claims.

What I claim as new and desire to secure by Letters Patent of the United States is:

1. Apparatus for valving fluid, comprising means providing an annular valve seat around an opening through a wall of a container for the fluid, an elongated valve member extending through the opening and having a closed inner end disposed within the container for substantially linear movements into and out of seating and sealing relationship with said seat and a shaped outer end outside the container forming one part of a keying-and-trapping means, said valve member having a reduced cross-sectional area between the seating position of said inner end and said outer end to permit drainage of the fluid when said inner end is moved inwardly out of sealing relationship with said seat, handle means pivoted outside said container and having a tiltable section shaped to form the other part of said keying-and-trapping means and disposed to receive said outer end therein when said valve member has substantially one angular orientation about its longitudinal axis and to trap said outer end for movements therewith when said valve member has significantly different angular orientations, means operable to urge said valve member to assume said different angular orientations and thereby prevent unintended separation of said handle from said outer end of said valve member, and means yieldably urging said valve member along said longitudinal axis and into engagement with said tiltable section of said handle.

2. Apparatus for valving fluid as set forth in claim 1, wherein the shaping of said tiltable section of said handle which forms said other part of said keying-and-trapping means is that of a non-circular opening therethrough, and wherein the shaping of said outer end of said valve member which forms said one part of said keying-and-trapping means is that provided by a non-circular cross-section which fits through said non-circular opening only when said valve member has said substantially one angular orientation and does not otherwise fit therethrough and which reduces to a smaller cross-section inwardly thereof fitting freely within said opening.

3. Apparatus for valving fluid as set forth in claim 2 wherein said shaping which forms said one part further includes a cross-section of said valve member inwardly of said smaller cross-section which does not fit through said opening whatever the angular orientation of said valve member.

4. Apparatus for valving fluid as set forth in claim 3 further comprising separable hinging means hinging said handle for pivotal movements about an axis transverse to said longitudinal axis, said handle maintaining itself in position for pivoting in said hinging means when said outer end of said valve member is keyed in and trapped by the shaped opening through said tiltable section thereof.

5. Apparatus for valving fluid as set forth in claim 4 wherein said non-circular cross-section of said outer end of said valve member includes at least one portion which is substantially flat and extends substantially transverse to said longitudinal axis, and wherein said means operable to urge said valve member to assume said different angular orientations includes at least one mechanical projection from said handle which is disposed to abut with said one portion when said handle is tilted and to thereby maintain it in angular orientation about said longitudinal axis corresponding to at least one of said different angular orientations.

6. Apparatus for valving fluid as set forth in claim 5 wherein said tiltable section of said handle is of sheet metal and substantially flat, wherein said non-circular outer end of said valve member includes a pair of diametrically opposite and parallel flat surfaces, wherein said non-circular opening through said tiltable section of said handle is in the form of a narrow slot just slighly wider than the spacing between said flat surfaces, and wherein said means operable to urge said valve member to assume said different angular orientations includes a pair of mechanical projections struck from material of said tiltable section to project to one side thereof in position to engage said flat surfaces near the narrower ends of said slot, said slot extending substantially transversely to both said longitudinal axis and said axis transverse thereto.

7. Apparatus for valving fluid as set forth in claim 6 wherein said means yieldably urging said valve member into engagement with said tiltable section of said handle comprises a spring exerting force between said tiltable section and said container and normally urging the handle to pivot in direction to move the valve to closure.

8. Apparatus for valving beverage from a container, comprising an annular valve seat around an opening through the bottom of the container, an elongated vertically-slidable valve member having a closed upper end disposed within the container with a seal to seat and to be lifted to unseat from said valve seat and a shaped lower end extending below the container and forming one part of a keying-and-trapping means, said valve member being hollow below said seal at said upper end and being opened laterally to admit flow of beverage therethrough when said valve member is raised, handle means having a substantially broad sheet-metal tiltable section having an opening therethrough shaped to form the other part of said keying-and-trapping means and disposed to receive said shaped lower end of said valve member therein when said valve member is in substantially one angular orientation about its vertical axis and to trap said lower end for vertical movements therewith when said valve member has significantly different angular orientations, means operable to urge said valve member to assume at least one of said different angular orientations and thereby prevent unintended separation of said handle from said lower end of said valve member, flange means fixed with the bottom of said container and having horizontally-aligned notches open at the front thereof, and cooperating horizontally-extending hinge means on said handle disposed for separable engagement with said flange means by way of said notches therein, said tiltable section of said handle being thereby pivoted in said flange means for tilting movements about a horizontal axis at the front of said flange means, means yieldably urging said valve member downwardly into engagement with said tiltable section of said handle, and lever means integral with said tiltable section of said handle projecting substantially vertically for forward and backward movements which effect tilt of said tiltable section and accompanying vertical sliding of said valve member.

9. Apparatus for valving beverage from a container as set forth in claim 8 wherein said opening through said tiltable section of said handle is a narrow slot, wherein the lowermost part of said lower end of said valve member has parallel vertical flats of spacing just less than the width of said slot and a significantly greater lateral span elsewhere therearound and said lowermost part adjoins a necked-down part of the valve member is of lesser diameter than said width and said necked-down part in turn adjoins an upper part of greater diameter than said width, whereby said necked-down part of said valve member tends to be trapped within said slot in the tiltable section of the handle, and further wherein a pair of square-ended tabs project down from said tiltable section of said handle at the narrower ends of said slot in position to engage said vertical flats and maintain said valve member in one of said different angular orientations whenever said handle is tilted.

10. Apparatus for valving beverage as set forth in claim 9 wherein said handle is substantially Z-shaped with said horizontal tiltable section being integral with an upstanding vertical lever portion at the front and with a depending vertical lever portion at the rear, forward and rearward motions of said lever portions serving to seat and unseat the valve.

* * * * *